March 16, 1954     I. A. ASP     2,672,225
CHANGE SPEED CLUTCH
Filed June 21, 1949
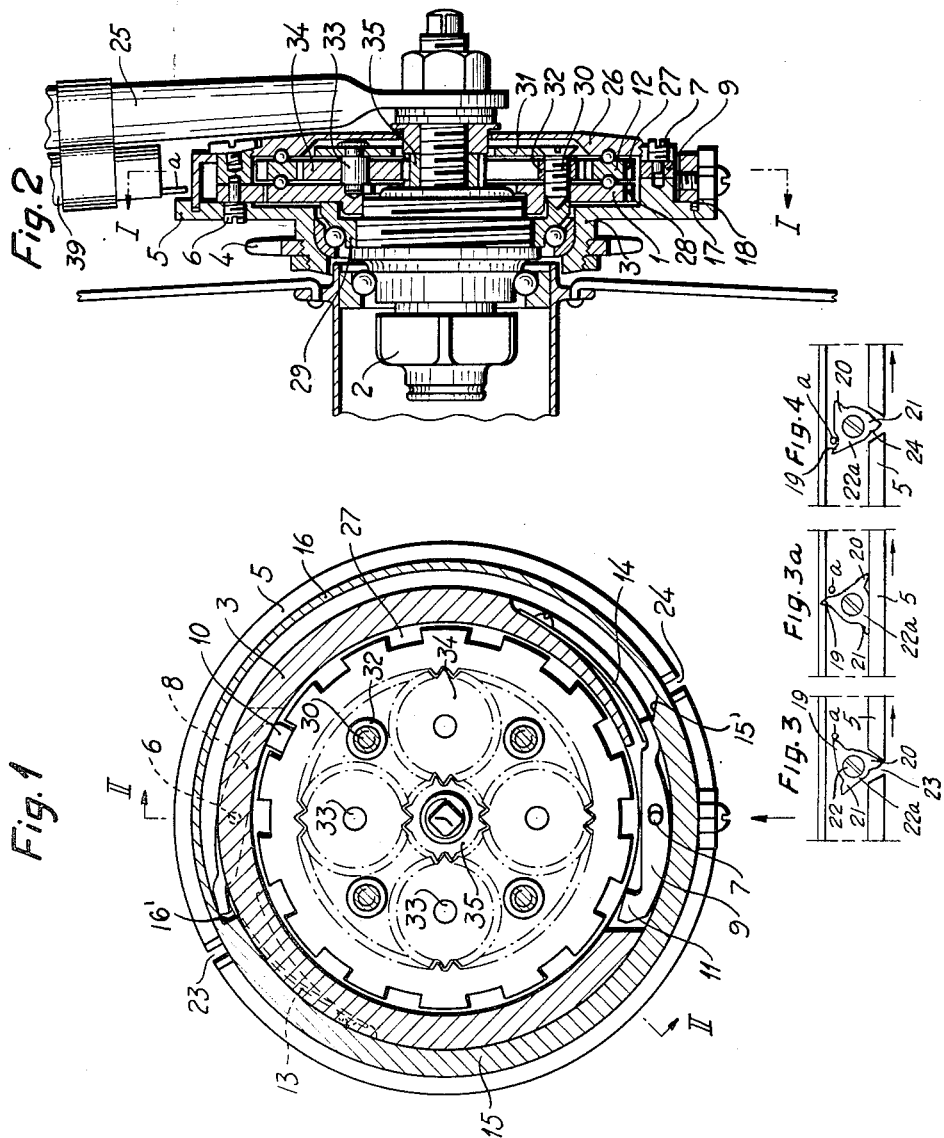

Patented Mar. 16, 1954

2,672,225

UNITED STATES PATENT OFFICE 2,672,225

CHANGE SPEED CLUTCH

Ivar Alvar Asp, Stockholm, Sweden, assignor to Husqvarna Vapenfabriks Aktiebolag, Huskvarna, Sweden, a corporation of Sweden Application June 21, 1949, Serial No. 100,480

Claims priority, application Sweden June 30, 1948

1 Claim. (Cl. 192—48)

The present invention relates to change speed gearings for vehicles, particularly bicycles. Between the member serving as a driving member for the gearing and a member driven by the gearing, the change speed gearing may contain one or more gear steps in addition to the step for direct drive.

One object of the invention is to render possible a convenient and safely operating change from one gear speed to another.

A further object of the invention is to provide means in a change speed gearing by which the change may be effected without the generation of shocks and blows between the members being engaged and disengaged at the shifting operation, whereby the life of the gearing may be increased.

The invention also has for its object to provide a simple and compact change speed gearing structure, which may easily be mounted at the rear hub of a bicycle, at the manufacture of bicycles as well as on existing bicycles having the conventional rear hub without change speed gearing.

Further objects and attendant advantages of the invention will appear from the following detailed description of the embodiment of a two speed gearing illustrated in the accompanying drawing, in which Fig. 1 is a transverse section of the change speed gearing substantially on line I—I in Fig. 2, Fig. 2 is a sectional view substantially on the broken line II—II in Fig. 1, Fig. 3 is a plan view of a detail in one position, Fig. 3a is a plan view of the detail of Fig. 3 in another position, and Fig. 4 is a similar plan view of said detail in another position.

The change speed gearing consists, in the construction shown, of a block or disk 1, which is threaded, preferably by means of a left-handed screw thread, onto the driving member 2 for the rear hub of the bicycle in place of the stop ring for the chain sprocket as used in ordinary bicycles. Rotatably mounted on the outside of the block 1 is a preferably closed hood 3, to which is secured a chain sprocket 4 constituting the driving member of the gearing. The chain sprocket 4 is taken to be operated by means of a chain in the ordinary manner. In the driving of the bicycle, the hood will rotate at a speed corresponding directly to the speed of the chain. Two locking bars 8 and 9 are pivotally mounted about pins 6 and 7 respectively on the hood 3 and inside an outwardly directed flange 5, with which the hood is made integral. The apertures provided in the locking bars for the purpose in view are preferably elongated. The locking bars are secured to be moved in different planes, the one locking bar 8, which is provided with an abutment 10, being intended to cooperate with a locking toothed rim 27 on the block 1 to provide for the direct drive, while the other locking bar 9 has an abutment 11 intended to cooperate with a locking toothed rim 28 on a gear ring 12 to provide for a stepped down gear. The locking bars are actuated by leaf springs 13 and 14, which are secured in the hood 3 and tend to turn the locking bars in a direction such that the abutments 10, 11 will be pressed against said locking toothed rims 27, 28. Provided on the hood 3 for the operation of the locking bars is a cam member consisting of an operating ring 15, 16, which is mounted inside the projecting flange 5, and which bears with its lateral surface against the latter. This operating ring 15, 16 surrounding the locking bars is intended to be entrained at the rotation of the hood, but may be turned on the hood. The operating ring is made with a smaller inner diameter for the half of its length (portion 15), whereas the other half 16 thereof has a greater inner diameter, so that the inside thereof forms a cam surface. In order that the operating ring shall be retained in its position, a groove 17 is provided in the side of the flange 5. The thin material 16 of the operating ring fits into said groove 17, while the stouter member 15 is provided with a corresponding flange 18. The operating ring is formed in such manner that a sloping transition surface 15' is formed between the stouter portion 15 and the thinner portion 16 at one point, whereas the other transition surface 16' is substantially radial. It will be seen from the foregoing that the operating ring 15, 16 is normally entrained with the hood 3 in the rotation thereof. However, the operating ring has arranged thereon a pawl with three teeth 19, 20, 21 (Figs. 3 and 4), said pawl being pivotally mounted on a stud 22 secured in the operating ring. The pawl is located in such manner that if a tooth 19 (Fig. 3) is on a line perpendicular to the flange 5 and points away from this flange, the remaining two teeth 20 and 21 bear on the flange 5. The flange 5 has provided therein two diametrically opposed recesses 23 and 24, into which one of said teeth, such as the tooth 20, may be introduced at the rotation of the pawl around the stud (Fig. 4). The pawl may be turned by means of an operating device (not shown) arranged on the frame 25 of the bicycle.

The abovementioned gear ring 12 is arranged adjacent to the block 1, and is rotatably mounted relatively to said block and retained in position relatively to the hood 3 by means of a shield 26. As stated, this gear ring is provided with a locking toothed rim 27 along the outer periphery thereof. Internally, the gear ring carries a tooth formation. The locking toothed rims 27, 28, which are located adjacent to each other, have equal outer diameters.

A bearing ring 29 is screwed by means of a right-handed thread onto the driving member 2, said bearing ring having the hood 3 mounted thereon by means of ball bearings. Provided in the bearing ring 29 are apertures having the ends of screws 30 secured in the block 1 extending therethrough. Inasmuch as the block 1 is secured to the driving member 2 by means of a left-handed thread, as previously stated, said screws 30 will lock the block and the bearing ring relatively to the driving member. The screws 30 retain a mounting disk 31 by their heads, said mounting disk being kept at a certain distance from the block 1 by means of distance tubes 32. Four intermediate gear wheels 34 are mounted between the mounting disk and the block by means of bearing studs 33 secured in the mounting disk 31 and extending into apertures in the block 1, said intermediate gear wheels engaging the internal tooth formation of the gear ring 12. Furthermore, the gear wheels 34 are in mesh with a gear wheel 35 threaded fast onto the axle of the hub at the center of the contrivance.

The device operates in the following manner. If the bicycle is to be driven without any stepped-down speed, the hood 3 with the sprocket 4 rigidly mounted thereon shall be caused, as will appear from the foregoing, to transfer its rotary movement directly to the driving member 2. This is effected by the feature that the locking bar 8, which is located in the same plane as the locking toothed rim 28, is caused with its abutment 10 to engage between two teeth of the rim 28. The hood 3 having the locking bar mounted thereon will then of course compel the block 1 to be entrained in the rotary movement, whereby this movement is transferred to the driving member 2. On the other hand, if the speed is to be stepped down, the other locking bar 9, which is located in the same plane as the gear ring 12, shall instead be caused to engage with its abutment 11 into the toothed rim 27 of said gear ring. Hereby the rotary movement of the hood 3 will be transferred to the driving member 2 over the intermediate gear wheels 34. By suitably selecting the diameters of the various gear wheels, the desired stepped down change of the speed will be obtained.

In Figs. 3 to 4, a denotes the manually operable pin or abutment mounted movably on a holder 39 on the bicycle frame which is used for initiation of the shifting operation. During the normal rotation of the gear housing 3 the pawl 22a has one tooth 20 in one of the recesses 23, 24. As shown it has tooth 20 in the recess 23 with tooth 19 directed obliquely upward so as to strike pin a, as said pin is introduced in the path of the pawl. After engaging pin a, tooth 19 forces pawl 22a to rotate about screw 22 until tooth 21 bears upon the flange 5 and is prevented from rotating further, Fig. 3a. This makes it possible to stop the operating ring 15, 16 for half a revolution, i. e. until the housing with flange 5 has rotated to a position in which the pawl 22a has reached the next recess 24. In this instant pawl 22a is rotated again about its screw 22 to bring next tooth 21 into recess 24 as shown in Fig. 4. The pin a is now free to pass pawl 22, and just before leaving pin a touches tooth 19 to bring the pawl again to a position, in which tooth 20 is directed obliquely upward as did tooth 19 at the beginning of the operation. After this the pin a may be retracted, manually or for example by spring means.

In Fig. 1 the pawl 9 has just been operated and disengaged, and thus the pawl 22a should stand in register with recess 24.

A change of the speed is brought about in the following manner. The leaf springs 13, 14 normally tend to press up one end of the locking bars toward the operating pins 15, 16. If this portion of a locking bar is located opposite the stouter portion 15 of the operating ring, the abutments 10 and 11 cannot be brought down into the recesses 28 and 27, respectively, as will be seen from the drawing. On the other hand, should said portion of the locking bars be located right opposite the thinner portion 16 of the operating ring, the latter has turned round the stud 6 and 7 respectively, so that the abutment of the locking bar will be in a recess 28 or 27 in a locking position. In normal driving, the operating ring rotates, as stated, with the hood at the movement of the latter, and thus takes a fixed position relatively to the locking bars, for instance the position shown in Fig. 1, where the locking bar 8 bears on the thinner portion of the operating ring and the abutment 10 of the bar is introduced into a recess 28 in the block 1 and is in locking engagement with the latter. Direct drive is thus provided for. If a change of the speed is desired, the operating device (Fig. 2) secured on the frame 25 will be operated. This operating device is then struck at the rotation of the operating ring by the tooth 19 of the pawl 19—21 located at right angles to the flange 5, the pawl and the operating ring being thus retained in this position, until a recess 23, 24 in the rotating hood 3 has been brought into register with the tooth 20. This tooth is thus turned into the recess in consideration, and the tooth 19 does not bear any longer on the operating device, but the tooth 21 is caused to assume the former position of the tooth 19, whereupon the operating ring rotates together with the hood in their mutual new positions. During this rotary movement of the hood relatively to the operating ring, the hood 3 having then turned together with the locking bars in a clockwise direction in Fig. 1, the locking bar 8 will have been forced inwardly with its one end by the sloping cam surface 15' on the operating ring, on a turning movement of the hood 3 for a half revolution, the abutment 10 having thus been brought out of engagement with the locking toothed rim 28 of the block 1. At the same time, or substantially at the same time the outer end of the locking bar 9 has been released from the stouter portion of the operating ring, that is to say, it has passed over the radial transition surface 16' between the ring portions 15, 16, so that the spring has been caused to force out said end portion against the thinner portion 16, whereby the abutment 11 has been pressed into engagement with the locking toothed rim 27 of the gear ring 12. Hereby the turning movement of the hood 3 will be transferred onto the driving member 2 over the gear ring 12 and the gear wheels 34. The hub axle and the gear wheel 35 secured thereto are of course stationary and do not rotate. When the speed is stepped down, the driving member 2 will thus rotate by the fact that the gear wheels 34, which are secured to the block 1, roll on the stationary gear wheel 35 so as to cause their bearing studs 33 to entrain the block 1 and the driving member 2.

The elongated apertures, by means of which the locking bars 8 and 9 are secured in the hood, serve to wedge the locking bars fast in the hood at the braking of the bicycle.

The change speed gearing described is constructed for two different speeds, but it is evident that the invention is not confined to this number of speeds. In addition, various modifications may be conceived of with respect to the coupling of the rotating hood to the block and the various wheels secured on the hub axle. The gearing according to the invention may also be conceived of as being mounted in the hub portion of the bicycle. Thus the invention is not limited to the construction according to the illustrated details.

The novel arrangement has been described as applied to an ordinary bicycle, but it is obvious that it may be brought into use in many other constructions demanding a simple, inexpensive change speed gearing which is safe in operation. In this connection the advantage of the novel construction residing in that the movable engaged gear wheels are entirely enclosed deserves to be specially mentioned, inasmuch as said feature contributes toward the high safety in operation.

What I claim is:

Clutch means for bicycles with a plurality of change speed steps comprising a driving member, a driven member, a member having a plurality of locking toothed rims, said locking toothed rims being selectively connected to the driving member, a locking bar for each rim pivoted to the driving member, springs attached to the driving member and actuating the locking bars, an operating ring rotatably mounted on the driving member, but adapted to be entrained thereby during driving, said operating ring having cam surfaces engaged with the locking bars by the actuation of said springs, the cam surfaces being located to disengage a locking bar from its corresponding toothed rim as a result of a rotation of the operating ring relatively to the driving member substantially at the same time as another locking bar is engaged with its toothed rim.

IVAR ALVAR ASP.

References Cited in the file of this patent

UNITED STATES PATENTS

| Number | Name | Date |
|---|---|---|
| 465,998 | Pursell | Dec. 29, 1891 |
| 1,122,500 | Henry | Dec. 29, 1914 |
| 2,395,576 | Moroney | Feb. 26, 1949 |

FOREIGN PATENTS

| Number | Country | Date |
|---|---|---|
| 26,980 | Great Britain | Nov. 21, 1910 |